(12) United States Patent
Kikuchi

(10) Patent No.: US 10,026,105 B2
(45) Date of Patent: Jul. 17, 2018

(54) DISPLAY SYSTEM, DIGITAL SIGNAGE APPARATUS WHICH DISPLAYS ADVERTISEMENTS, AND COMPUTER-READABLE STORAGE MEDIUM

(71) Applicant: CASIO COMPUTER CO., LTD., Tokyo (JP)

(72) Inventor: Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 89 days.

(21) Appl. No.: 14/225,900

(22) Filed: Mar. 26, 2014

(65) Prior Publication Data

US 2014/0297429 A1 Oct. 2, 2014

(30) Foreign Application Priority Data

Mar. 27, 2013 (JP) ................................ 2013-066876

(51) Int. Cl.
*G06Q 30/00* (2012.01)
*G06Q 30/02* (2012.01)

(52) U.S. Cl.
CPC ............................... *G06Q 30/0276* (2013.01)

(58) Field of Classification Search
CPC .................................................. G06Q 30/0276
See application file for complete search history.

(56) References Cited

U.S. PATENT DOCUMENTS 6,401,033 B1 * 6/2002 Paulauskas ............ G01C 21/34
701/465
6,527,641 B1 * 3/2003 Sinclair .................. A63F 13/12
455/456.1

(Continued)

FOREIGN PATENT DOCUMENTS

CN 102254270 A 11/2011
JP 2007-293534 A 11/2007

(Continued)

OTHER PUBLICATIONS

Japanese Office Action dated May 17, 2016 in Japanese Patent Application No. 2013-066876.

(Continued)

*Primary Examiner* — Bennett M Sigmond
*Assistant Examiner* — Scott C Anderson
(74) *Attorney, Agent, or Firm* — Scully, Scott, Murphy & Presser, P.C.

(57) ABSTRACT

A display system, a display apparatus, computer-readable storage medium are described. According to one implementation, a display system includes display apparatuses placed at a plurality of designated sites and a management server. Each of the display apparatuses include a communication unit which acquires user information from a terminal apparatus and transmits the user information to the management server. The management server includes a server receiving unit which receives the user information, a user registering unit which registers the user information on the terminal apparatus, a sheet creating unit which creates a stamp rally sheet including at least one of the plurality of designated sites for the user information, and a server transmitting unit which transmits the created stamp rally sheet to the display apparatus.

6 Claims, 13 Drawing Sheets

(56) References Cited

U.S. PATENT DOCUMENTS

| | | | | |
|---|---|---|---|---|
| 7,278,920 B1* | 10/2007 | Klamer | ............... | A63F 13/12 |
| | | | | 463/31 |
| 2001/0032132 A1* | 10/2001 | Moran | ............... | G06Q 30/02 |
| | | | | 705/14.19 |
| 2004/0204243 A1* | 10/2004 | de Mello Costa | ...... | G07F 17/32 |
| | | | | 463/42 |
| 2011/0300926 A1* | 12/2011 | Englman | ............ | G07F 17/3223 |
| | | | | 463/25 |
| 2013/0013414 A1* | 1/2013 | Haff | ............... | G06Q 30/0241 |
| | | | | 705/14.64 |

FOREIGN PATENT DOCUMENTS

| | | |
|---|---|---|
| JP | 2010-055329 A | 3/2010 |
| JP | 2012-128210 A | 7/2012 |

OTHER PUBLICATIONS

First Office Action dated Oct. 19, 2016 received in Chinese Patent Application No. CN 201410119666.9 together with an English language translation.

* cited by examiner

FIG.14

| ITALIAN RESTAURANT | 100-YEN SHOP | JAPANESE RESTAURANT |
|---|---|---|
| STATIONERY | GROCERY | TOY |
| RAMEN | KITCHENWARE | HAMBURGER |

FIG.15

| CHILDREN'S CLOTHING<br>20:00 TO 22:00 | RAMEN<br>14:00 TO 17:00 | MEN'S CLOTHING<br>9:00 TO 12:00 |
|---|---|---|
| JAPANESE RESTAURANT<br>14:00 TO 17:00 | GROCERY<br>9:00 TO 11:00 | TOY<br>20:00 TO 22:00 |
| ICE CREAM<br>9:00 TO 12:00 | EYEGLASSES<br>9:00 TO 11:00 | COFFEE<br>17:00 TO 19:00 |

DISPLAY SYSTEM, DIGITAL SIGNAGE APPARATUS WHICH DISPLAYS ADVERTISEMENTS, AND COMPUTER-READABLE STORAGE MEDIUM

BACKGROUND OF THE INVENTION

Field of the Invention

The present invention relates to a display system, a display apparatus, and a computer-readable storage medium.

Description of the Related Art

Conventional display apparatuses, such as digital signage apparatuses, can readily change the contents of advertising images and always provide the latest information for viewers, and have therefore been used as apparatuses exerting excellent advertising effectiveness (for example, see Japanese Unexamined Patent Application Publication No. 2012-128210).

In recent years, techniques have also been developed for issuing premiums, such as a coupon, relevant to the advertising contents on a display apparatus by forwarding the premiums from the display apparatus to terminal apparatuses (mobile terminals) owned by customers through communication between the terminal apparatuses and the display apparatus. The display apparatus issues premiums, such as a coupon, to attract conspicuous attention and exert excellent advertising effectiveness.

SUMMARY OF THE INVENTION

Such display apparatuses for issuing premiums are expected to exert higher advertising effectiveness.

Accordingly, it is an object of the present invention to provide a display system, a display apparatus, and a computer-readable storage medium that can exert higher advertising effectiveness.

In order to achieve the above object, according to an aspect of the present invention, there is provided a display system including display apparatuses placed at a plurality of designated sites and a management server, the display apparatuses each including:
a display unit; and
a communication unit which acquires user information from a terminal apparatus and transmits the user information to the management server;

the management server including:
a server receiving unit which receives the user information transmitted from the display apparatus;
a user registering unit which registers the user information on the terminal apparatus;
a sheet creating unit which creates a stamp rally sheet including at least one of the plurality of designated sites for the user information registered in the user registering unit; and
a server transmitting unit which transmits the stamp rally sheet created by the sheet creating unit to the display apparatus.

According to the above invention, it is possible to achieve a display system, a display apparatus, and a computer-readable storage medium that can exert higher advertising effectiveness.

BRIEF DESCRIPTION OF THE DRAWINGS

The present invention and the above-described objects, features and advantages thereof will become more fully understood from the following detailed description with the accompanying drawings and wherein.

FIG. 14 illustrates an example arrangement of shops in a bingo card; and

FIG. 15 illustrates an example arrangement of shops in a bingo card.

DETAILED DESCRIPTION OF THE PREFERRED EMBODIMENTS

Preferred embodiments according to the present invention will now be described with reference to the accompanying drawings. Although various preferred technical limitations are applied to the following embodiments according to the present invention, the scope of the present invention should not be limited to these embodiments and examples illustrated in these drawings.

Figure 1:
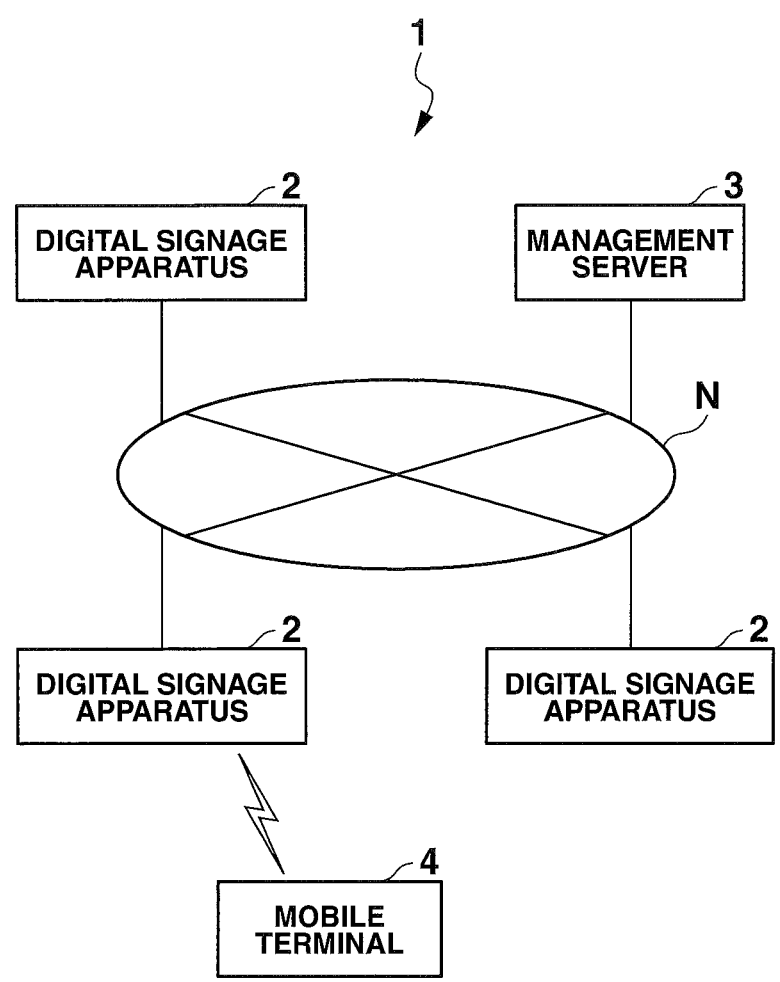
FIG. 1 is a schematic block diagram illustrating the configuration of a display system according to the present invention.

FIG. 1 is a schematic block diagram illustrating a configuration of a display system according to the present invention.

As illustrated in FIG. 1, the display system 1 includes a display apparatus in the form of a digital signage apparatus 2 and a management server 3 capable of communication with the digital signage apparatus 2 through a network N. The display system 1 includes a mobile terminal 4 as a terminal apparatus capable of communication with the digital signage apparatus 2 through a short distance radio communication technique, such as NFC.

The multiple digital signage apparatuses 2 are placed in a plurality of designated sites and can communicate with the management server 3 through the network N.

Figure 2:
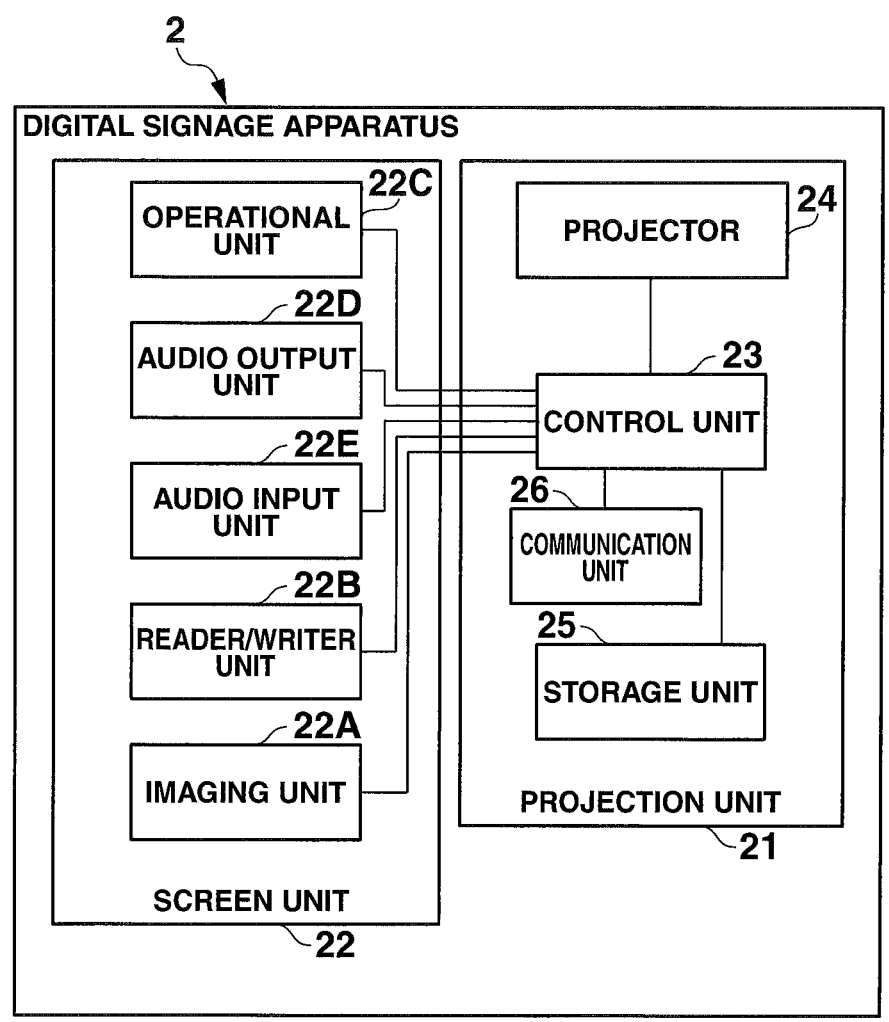
FIG. 2 is a block diagram illustrating the main control configuration of a digital signage apparatus.

FIG. 2 is a block diagram illustrating the main control configuration of the digital signage apparatus 2.

As illustrated in FIG. 2, the digital signage apparatus 2 includes a projection unit 21 which emits the image light for a predetermined image, and a screen unit 22 which receives the image light from the projection unit 21 with a back surface to project the image on a front surface.

Each digital signage apparatus 2 is provided with inherent information corresponding to the designated site of the digital signage apparatus 2.

The projection unit 21 includes a control unit 23 controlling each component in the digital signage apparatus 2, a projector 24 converting image data outputted from the control unit 23 on the basis of content data into image light to emit the light onto the screen unit 22, a storage unit 25 storing various pieces of content data, such as image data and audio data, and the inherent information corresponding to each designated site, and a communication unit 26 communicating with the management server 3 through the network N. A reader/writer unit 22b described below functions as a part of the communication unit of the apparatus and communicates with the mobile terminal 4 through a short distance radio communication technique.

The content data stored in the storage unit 25 includes, for example, information on collection of series of stamps at shops (hereinafter, referred to as stamp rally) described below and commercial message information broadcast through the stamp rally.

Figure 3:
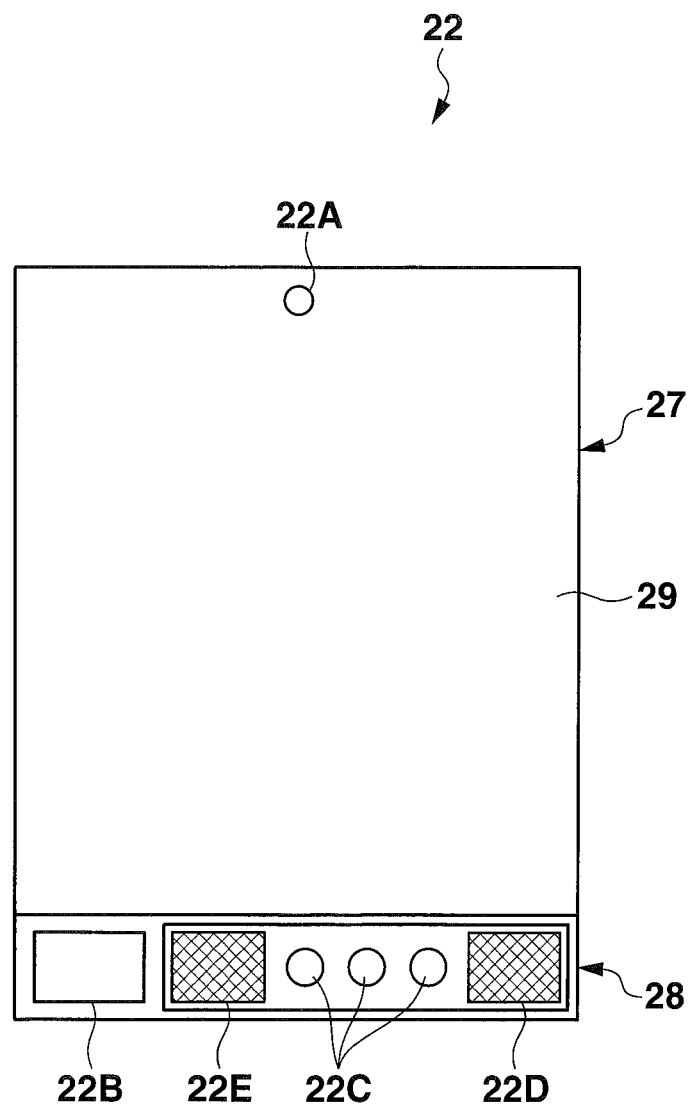
FIG. 3 is a schematic front view of the digital signage apparatus.

As illustrated in FIG. 3, the screen unit 22 includes a display unit 27 having a rectangular front view and a base 28 supporting the display unit 27.

The display unit 27 has a transparent plate 29, such as an acrylics plate, substantially orthogonal to the direction of the emitted image light. The transparent plate 29 has a back surface on which a film screen for back surface projection is laminated. The film screen has a back surface on which a filmy Fresnel lens is laminated. The projector 24 projects still and moving images on this display unit 27.

The display unit 27 has an imaging unit 22a, such as a camera at its top. This imaging unit 22a captures a real-time image of a space facing the display unit 27.

The base 28 is provided with a reader/writer unit 22b for exchanging information through communication with the mobile terminal 4 and reading/writing the information for the mobile terminal 4, an operational unit 22c controllable with buttons, and an audio output unit 22d, such as a loudspeaker, and an audio input unit 22e, such as a microphone.

The reader/writer unit 22b, the operational unit 22c, the audio output unit 22d, the audio input unit 22e, and the imaging unit 22a are connected to the control unit 23, as illustrated in FIG. 2.

The control unit 23 in the digital signage apparatus 2 communicates with the mobile terminal 4 directed to the reader/writer unit 22b, and writes/reads information. For example, the control unit 23 reads information stored in the mobile terminal 4 through the reader/writer unit 22b during a reading mode. The control unit 23 also writes, for example, information stored in the storage unit 25 in the mobile terminal 4 through the reader/writer unit 22b during a writing mode. That is, the reader/writer unit 22b can communicate with the mobile terminal 4 through a short distance radio communication technique and functions as a part of the communication unit of the apparatus.

For example, the control unit 23 reads from the storage unit 25 content data relevant to the content of an operation based on operation signals from the operational unit 22c, and controls the projector 24 to display a still or moving image on the display unit 27 in the screen unit 22. For example, the control unit 23 reads from the storage unit 25 content data relevant to the content of an operation based on operation signals from the operational unit 22c, and controls the audio output unit 22d to output sound.

The control unit 23 stores information from the mobile terminal 4 acquired through the reader/writer unit 22b, in the storage unit 25. The reader/writer unit 22b functions as an acquisition unit acquiring user information (user ID) from the mobile terminal 4.

For example, the control unit 23 controls the communication unit 26 in response to operation signals from the operational unit 22c to communicate with the management server 3 and stores the information received from the management server 3 in the storage unit 25. For example, the control unit 23 controls the communication unit 26 in response to the operation signals from the operational unit 22c to communicate with the management server 3 and transmits the information stored in the storage unit 25 to the management server 3. For example, the communication unit 26 transmits the user information (user ID) which the reader/writer unit 22b functioning as an acquisition unit has acquired from the mobile terminal 4, to the management server 3.

Figure 4:
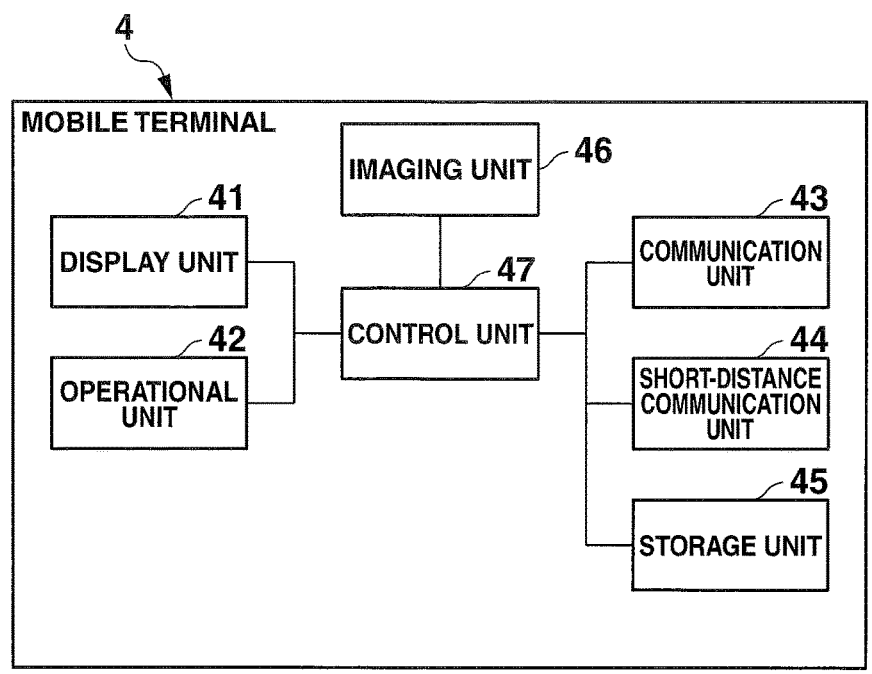
FIG. 4 is a block diagram illustrating the main control configuration of a mobile terminal.

FIG. 4 is a block diagram illustrating the main control configuration of the mobile terminal 4. The mobile terminal 4 is a mobile device such as, a mobile telephone, a smart phone, and a tablet terminal.

As illustrated in FIG. 4, the mobile terminal 4 includes a display unit 41, an operational unit 42, a communication unit 43, a short-distance communication unit 44, a storage unit 45, an imaging unit 46, and a control unit 47 controlling these units, for example.

The display unit 41 includes, for example, a liquid crystal panel or an organic EL panel.

The operational unit 42 includes, for example, a touch panel or operation keys.

The communication unit 43 operates in accordance with communication standards, such as 3G, LTE, and Wi-Fi.

The short-distance communication unit 44 communicates with the reader/writer unit 22b in the digital signage apparatus 2 through, for example, a short-distance radio communication technique, such as NFC.

The storage unit 45 stores applications for communication with the digital signage apparatus 2. Examples of the applications for communication with the digital signage apparatus 2 include a coupon acquisition application. The storage unit 45 stores, for example, information acquired through communication with the digital signage apparatus 2 or information acquired from the management server 3.

The imaging unit 46 is a camera which can take still and moving images.

The control unit 47 detects the short-distance communication unit 44 to be close to the reader/writer unit 22b when the mobile terminal 4 is directed to the reader/writer unit 22b of the digital signage apparatus 2. The control unit 47 then starts a coupon acquisition application and performs the transmission and reception of the information with the digital signage apparatus 2 through the short-distance communication unit 44 and reader-writer unit 22b.

Figure 5:
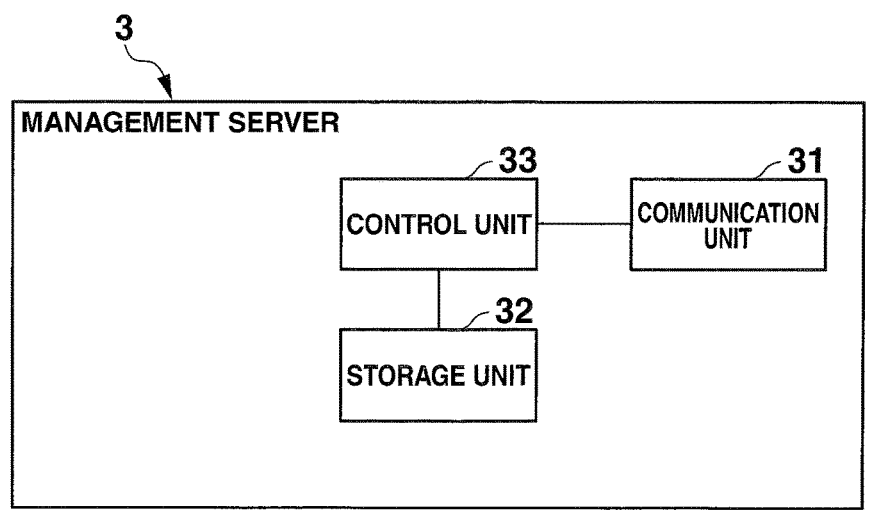
FIG. 5 is a block diagram illustrating the main control configuration of a management server.

FIG. 5 is a block diagram illustrating the main control configuration of the management server 3.

As illustrated in FIG. 5, the management server 3 includes, for example, a communication unit 31 communicating with the digital signage apparatus 2 through the network N, a storage unit 32 storing various pieces of information and data, and a control unit 33 controlling each component in the server 3. The communication unit 31 needs to communicate with at least the digital signage apparatus 2 and may also communicate with the mobile terminal 4.

The display system 1 according to the present invention urges a user having the mobile terminal 4 to scour the digital signage apparatuses 2 placed at a plurality of designated sites for the stamp rally, in order to provide advertising effectiveness of strongly impressing an advertising object displayed with the digital signage apparatuses 2. For example, the display unit 27 in the digital signage apparatus 2 displays information on the stamp rally and information on commercial messages for the user participating in the stamp rally (for example, information on commercial messages from chain shops or shops in a shopping mall).

The control unit 33 in the management server 3 also functions as a system control unit for the overall control of the display system 1, and controls a system supporting a stamp rally using the digital signage apparatus 2.

Specifically, the control unit 33 in the management server 3 controls storing of the information transmitted from the digital signage apparatus 2 in the storage unit 32. For example, the control unit 33 controls storing and registration of the user information on the mobile terminal 4 (user ID) transmitted from the digital signage apparatus 2 in the storage unit 32.

The control unit 33 performs control as a sheet creating unit creating stamp rally sheet data including at least one of the plurality of designated sites having the digital signage apparatuses 2 placed thereat for user information (user ID) registered in the storage unit 32 as a user registering unit.

For example, the control unit 33 as a sheet creating unit controls the creation of a stamp rally sheet in accordance with the count of communication in each designated site stored in the storage unit 32. The control unit 33 as a sheet creating unit controls the creation of a stamp rally sheet including more designated sites involving a lower count of communication than designated sites involving a higher count of communication stored in the storage unit 32.

The control unit 33 as a sheet creating unit controls the creation of a stamp rally sheet in which a time zone for visiting each designated site is set in accordance with the communication time in the designated site stored in the storage unit 32. The control unit 33 as a sheet creating unit controls the creation of a stamp rally sheet in which a time zone involving a lower count of communication rather than a time zone involving a higher count of communication stored in the storage unit 32 is set as a time zone for visiting a designated site.

The control unit 33 as a sheet creating unit controls the creation of a stamp rally sheet including multiple designated sites in accordance with a priority stored in the storage unit 32.

The control unit 33 as an inherent information accumulating unit controls accumulation of inherent information for a stamp rally sheet allocated to the mobile terminal 4 on the basis of the mobile terminal 4 acquiring inherent information corresponding to each designated site assigned to the digital signage apparatus 2. For example, after detecting a history of communication between the digital signage apparatus 2 and the mobile terminal 4, the control unit 33 determines that the mobile terminal 4 acquires inherent information corresponding to the designated site. For example, the control unit 33 detects performing of a process for correlating user information (user ID) on the mobile terminal 4 with inherent information corresponding to each designated site (for example, a process for transmitting/receiving user information (user ID) correlated with the inherent information) through communication between the digital signage apparatus 2 and the mobile terminal 4, and thereby determines that the mobile terminal 4 acquires inherent information corresponding to the designated site.

The control unit 33 as a privilege determining unit performs a lottery process in accordance with an accumulation state of inherent information in a stamp rally sheet, and determines privilege information given to the mobile terminal 4 to which the stamp rally sheet is allocated.

The storage unit 32 has a region storing and registering the user information (user ID) on the mobile terminal 4 and functions as a user registering unit.

The storage unit 32 has a region which stores the stamp rally sheet data created in the control unit 33 as a sheet creating unit and functions as a sheet storage unit. The sheet storage unit also stores the stamp rally sheet data accompanied with the accumulated inherent information.

The storage unit 32 has a region storing the count of communication between the mobile terminal 4 and the digital signage apparatus 2 for each designated site, and functions as a communication count storage unit.

The storage unit 32 has a region storing the time of communication between the mobile terminal 4 and the digital signage apparatus 2 for each designated site, and functions as a communication time storage unit.

The storage unit 32 has a region for storing the priority of the plurality of designated sites having the digital signage apparatuses 2 placed thereat for each predetermined condition, and functions as a priority storage unit.

The storage unit 32 has a region for storing a program for operating each component in the management server 3 so as to receive the user information (user ID) from the mobile terminal 4, register the user information (user ID), create a stamp rally sheet for each user information (user ID), or transmit the data of the stamp rally sheet to the digital signage apparatus 2. That is, the control unit 33 controls the operation of each component in the apparatus on the basis of the program stored in the storage unit 32.

The communication unit 31 functions as a receiving unit receiving the user information (user ID) transmitted from the digital signage apparatus 2.

The communication unit 31 functions as a transmitter transmitting the data of a stamp rally sheet created by the control unit 33 as a sheet creating unit to the digital signage apparatus 2.

In the following embodiment, the display system 1 according to the present invention is applied to a lottery system for a user who participates in a stamp rally with the mobile terminal 4.

In the lottery system of this embodiment, the user having the mobile terminal 4 visits several shops to collect the records on utilization of the digital signage apparatuses 2 in a stamp rally held by scouring the digital signage apparatuses 2 placed at the shops in the plurality of designated sites. The mobile terminal 4 of the user is provided with a user ID as user information, and the digital signage apparatus 2 placed at a designated site for the stamp rally is provided with a shop ID as inherent information corresponding to the designated site.

Figure 6:
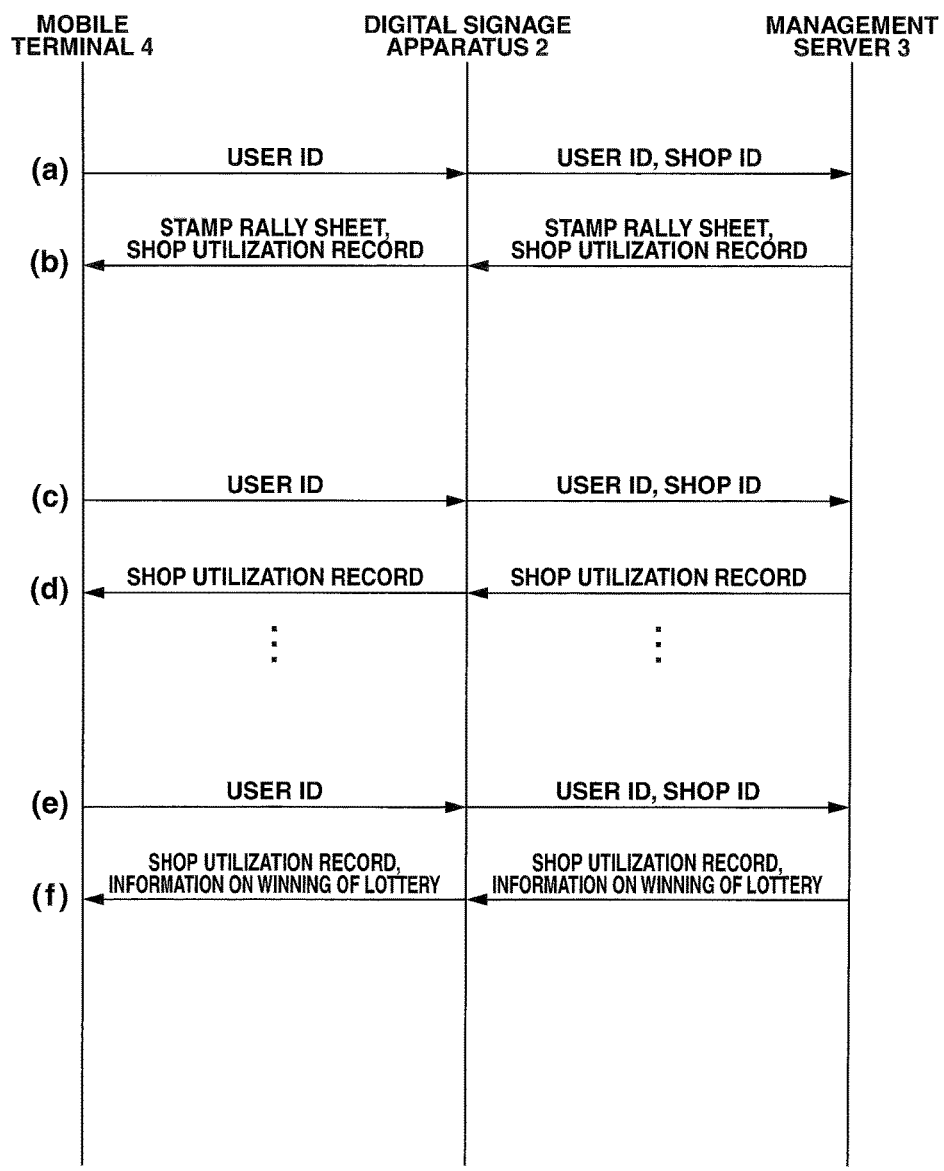
FIG. 6 illustrates a schematic communication flow of the correlation between the mobile terminal, the digital signage apparatus, and the management server.

FIG. 6 illustrates a schematic communication flow of the correlation between the mobile terminal 4, the digital signage apparatus 2, and the management server 3 in the display system 1 applied to the lottery system.

As illustrated in step (a) of FIG. 6, the digital signage apparatus 2 reads the user ID of the mobile terminal 4 when the mobile terminal 4 of the user is directed to the reader/writer unit 22*b* in the digital signage apparatus 2. The digital signage apparatus 2 transmits the user ID of the mobile terminal 4 and the shop ID assigned to the digital signage apparatus 2 and stored in the storage unit 25, to the management server 3.

Subsequently, as illustrated in step (b) of FIG. 6, the management server 3 receives and acquires the shop ID and the user ID of the mobile terminal 4, then registers the user ID and creates the data of the stamp rally sheet (for example, a bingo card) for the user ID. The management server 3 then accumulates the shop IDs in the created stamp rally sheet, keeps the shop utilization record, and transmits the data of the stamp rally sheet including the accumulated shop IDs to the digital signage apparatus 2. The mobile terminal 4 can acquire the data of the stamp rally sheet through the reader/writer 22b in the digital signage apparatus 2.

Subsequently, as illustrated in step (c) of FIG. 6, when the mobile terminal 4 is redirected to the reader/writer unit 22b in the digital signage apparatus 2, the digital signage apparatus 2 reads the user ID of the mobile terminal 4. The digital signage apparatus 2 then transmits the user ID of the mobile terminal 4 together with the shop ID assigned to the digital signage apparatus 2 to the management server 3.

Subsequently, as illustrated in step (d) of FIG. 6, the management server 3 receives the shop ID and the user ID of the mobile terminal 4. If the user ID is already registered, the management server 3 accumulates the shop IDs in the stamp rally sheet corresponding to the user ID to keep a shop utilization record and transmits the data of the stamp rally sheet including the accumulated shop IDs to the digital signage apparatus 2. The mobile terminal 4 can acquire the data of the stamp rally sheet through the reader/writer 22b in the digital signage apparatus 2.

These processes in steps (c) and (d) of FIG. 6 are repeated so that the user having the mobile terminal 4 accumulates the shop IDs on the stamp rally sheet in the stamp rally.

As illustrated in step (e) of FIG. 6, the digital signage apparatus 2 then reads the user ID of the mobile terminal 4 when the mobile terminal 4 is redirected to the reader/writer unit 22b in the digital signage apparatus 2. The digital signage apparatus 2 transmits the user ID of the mobile terminal 4 and the shop ID assigned to the digital signage apparatus 2, to the management server 3.

As illustrated in step (f) of FIG. 6, if the accumulation state of the shop IDs satisfies a predetermined lottery condition because the management server 3 receives the shop ID and the user ID of the mobile terminal 4 and accumulates the shop IDs in the stamp rally sheet corresponding to the user ID to keep the shop utilization record, the management server 3 performs a lottery process. The management server 3 then transmits the data of the stamp rally sheet including the accumulated shop IDs and information on the winning of the lottery (for example, coupon data) as a result of the lottery process, to the digital signage apparatus 2. The mobile terminal 4 can acquire the data of the stamp rally sheet and the information on the winning of the lottery (coupon data) through the reader/writer 22b in the digital signage apparatus 2.

Figure 7:
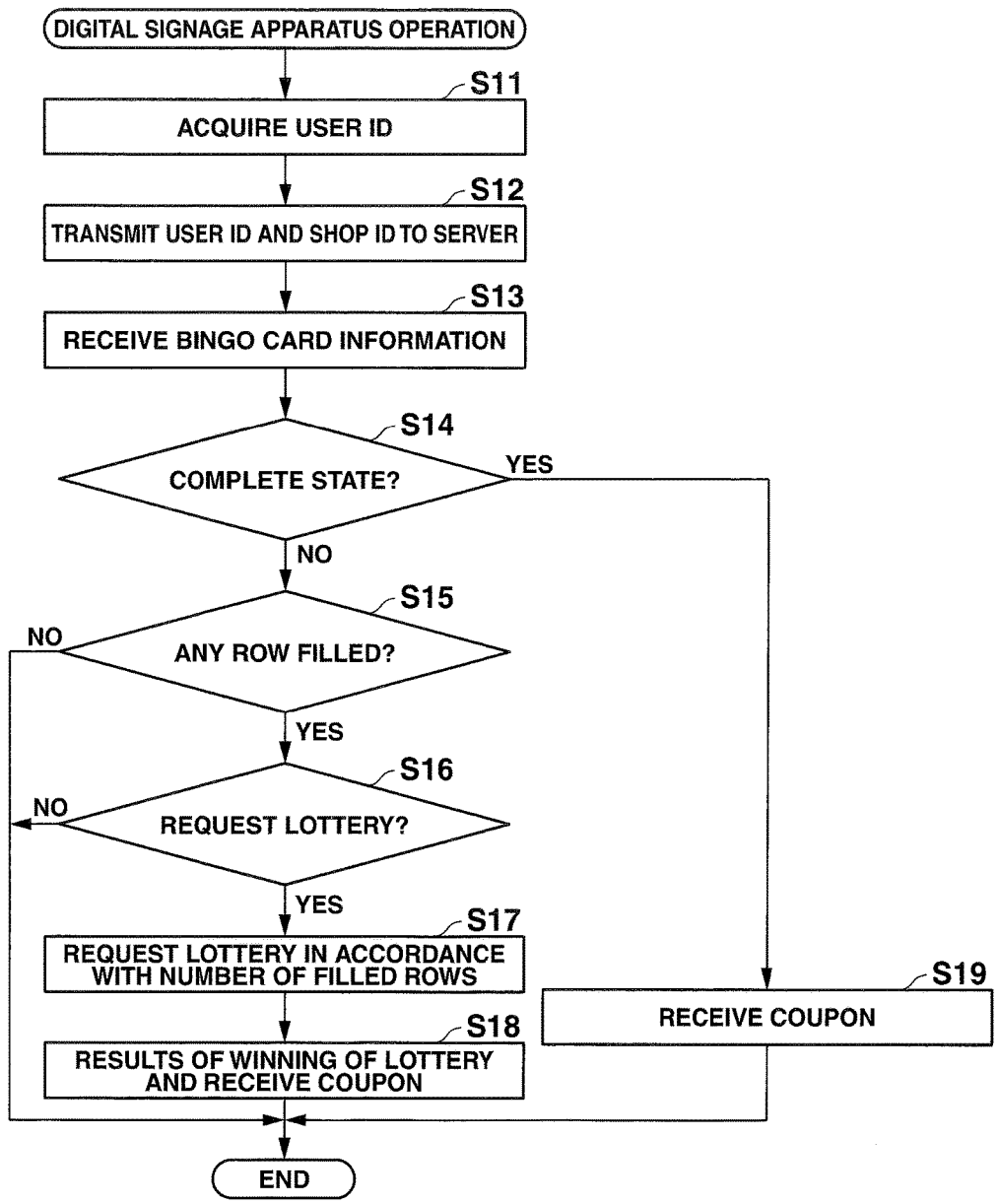
FIG. 7 is a flow chart illustrating an operational process in the digital signage apparatus.

An operational process of the digital signage apparatus 2 will now be explained in the case of applying the display system 1 according to the present invention to the lottery system with reference to the flow chart in FIG. 7.

In this exemplary explanation, the stamp rally is held by scouring a plurality of chain shops and collecting stamps based on the shop IDs assigned to the digital signage apparatuses 2 placed at the respective chain shops.

The display unit 27 in the digital signage apparatus 2 displays information on the ongoing stamp rally and information on commercial messages from the chain shops targeted for the stamp rally.

If the mobile terminal 4 is directed to the reader/writer unit 22b of the digital signage apparatus 2, the digital signage apparatus 2 reads and acquires the user ID of the mobile terminal 4 (step S11).

The digital signage apparatus 2 then transmits the shop ID stored in the storage unit 25 and the user ID of the mobile terminal 4 to the management server 3 (step S12).

The digital signage apparatus 2 then receives bingo card information in the form of the stamp rally sheet corresponding to the user ID of the mobile terminal 4 from the management server 3 (step S13). The received bingo card information includes information on the accumulated stamps based on the shop IDs of the digital signage apparatuses 2 in communication with the mobile terminal 4 through the reader/writer unit 22b. The digital signage apparatus 2 displays the image of the bingo card based on the bingo card information on the display unit 27 of the screen unit 22.

Figure 8:
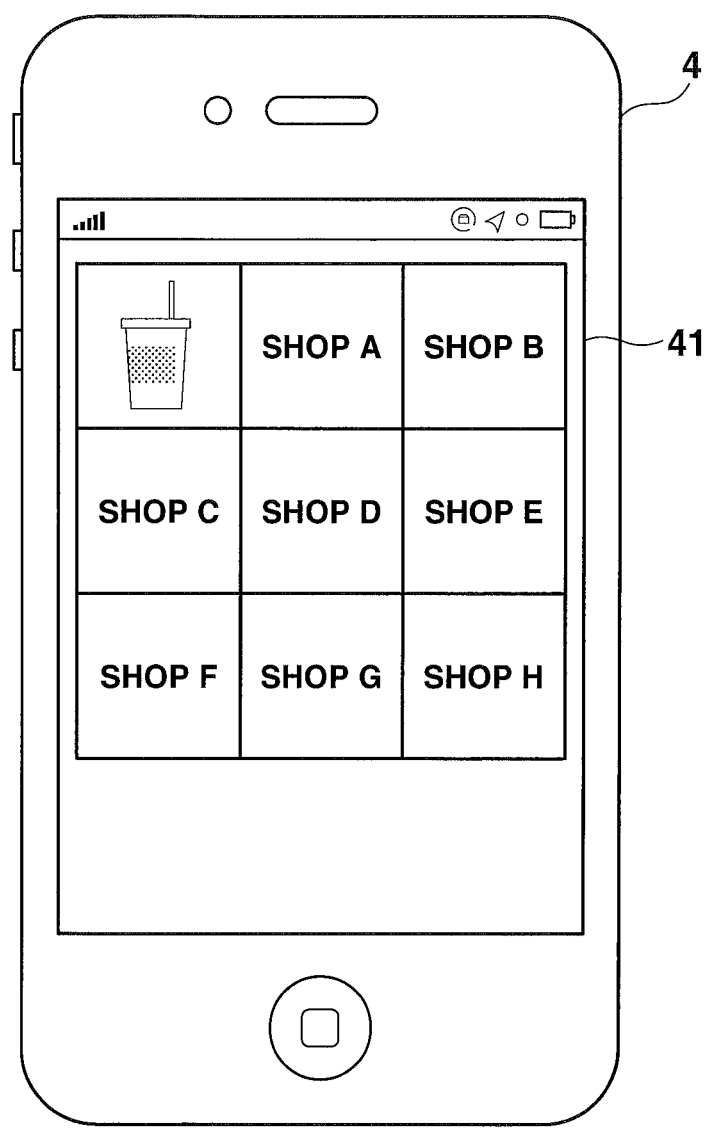
FIG. 8 illustrates an example screen of the mobile terminal displaying a bingo card.

At this time, the mobile terminal 4 acquires the bingo card information through the reader/writer unit 22b of the digital signage apparatus 2, and can display the image of the bingo card based on the bingo card information on the display unit 41, as illustrated in FIG. 8. For example, a bingo card provided at the first visit to a shop has one stamp in a cell for the first visited shop among nine cells in total for the shops targeted for the stamp rally, as illustrated in FIG. 8. Stamps are then collected in the cells for visited shops by scouring the shops targeted for the stamp rally displayed on the bingo card.

The control unit 23 then determines whether all the cells of the bingo card are filled with stamps (a complete state) (step S14).

If the control unit 23 in the digital signage apparatus 2 determines that the complete state is not achieved (step S14; NO), the control unit 23 determines whether any row on the bingo card is filled with stamps (step S15). If the control unit 23 in the digital signage apparatus 2 determines that no row is filled (no bingo is achieved) (step S15; NO), the digital signage apparatus 2 completes the process and is ready for a next user coming to the shop.

Figure 9:
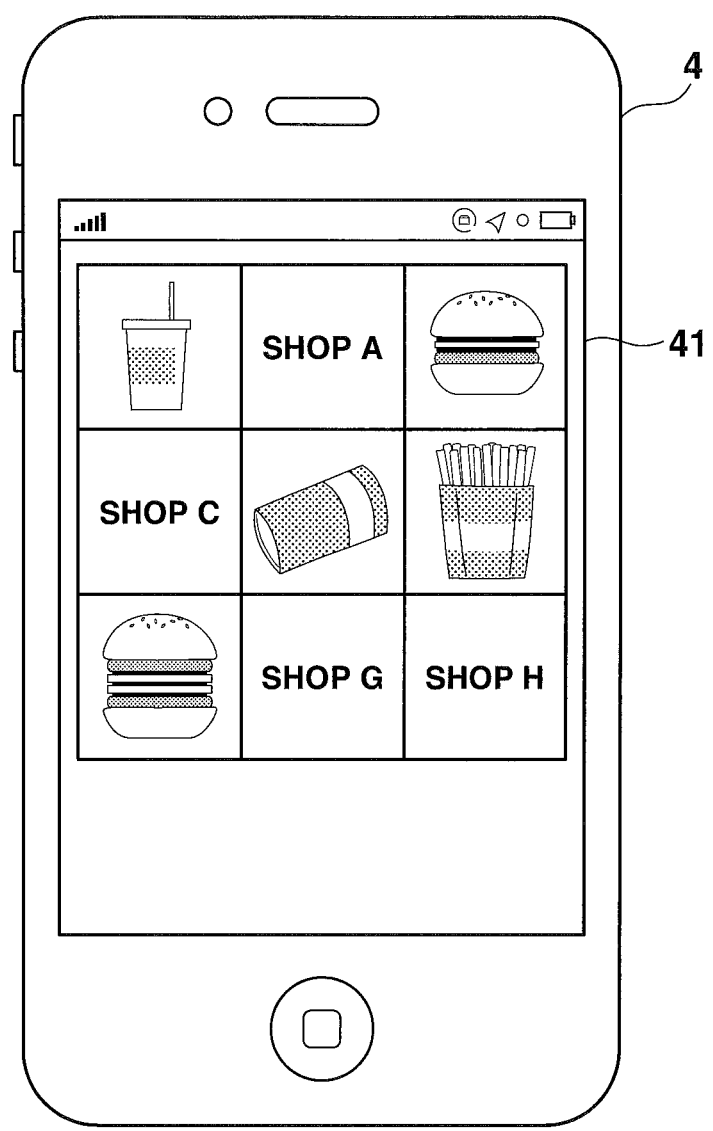
FIG. 9 illustrates an example screen of the mobile terminal displaying a bingo card.

If the control unit 23 in the digital signage apparatus 2 determines that one row is filled (bingo is achieved) (step S15; YES), for example, if bingo is achieved by putting stamps on several (for example, five) cells among nine cells in total for the shops targeted for the stamp rally to fill any row on the bingo card with the stamps (for example, a diagonal row is filled with three stamps) as illustrated in FIG. 9, the control unit 23 in the digital signage apparatus 2 displays a message on the display unit 27 in the digital signage apparatus 2 to prompt the user to request a lottery corresponding to the bingo (step S16).

If the user does not select the lottery request by, for example, operating the operational unit 22c in the digital signage apparatus 2 (step S16; NO), the digital signage apparatus 2 completes the process and is ready for a next user coming to the shop.

If the user selects the lottery request by, for example, operating the operational unit 22c in the digital signage apparatus 2 (step S16; YES), the control unit 23 in the digital signage apparatus 2 transmits a lottery request instruction in accordance with the number of the filled rows to the management server 3 (step S17).

The digital signage apparatus 2 then receives information on the winning of the lottery (for example, coupon data) as a result of the lottery process performed in response to the completion of bingo on the bingo card in association with the user ID of the mobile terminal 4, from the management server 3 (step S18). The digital signage apparatus 2 displays the image of a coupon based on the information on the winning of the lottery, on the display unit 27 in the screen unit 22.

Figure 10:
FIG. 10 illustrates an example screen of the mobile terminal displaying a discount coupon.

At this time, the mobile terminal 4 can acquire the information on the winning of the lottery through the reader/writer unit 22b in the digital signage apparatus 2, and can display the image of a coupon based on the information on the winning of the lottery, on the display unit 41, as illustrated in FIG. 10.

The digital signage apparatus 2 completes the process and is ready for a next user coming to the shop.

If the control unit 23 in the digital signage apparatus 2 determines that all the cells of the bingo card are filled with stamps (a complete state) (step S14; YES), the digital signage apparatus 2 receives information on the winning of a coupon (for example, coupon data) in response to the complete state on the bingo card in association with the user ID of the mobile terminal 4, from the management server 3 (step S19). The digital signage apparatus 2 displays the image of a coupon based on the information on the winning of a coupon on the display unit 27 in the screen unit 22.

Figure 11:
FIG. 11 illustrates an example screen of the mobile terminal displaying a discount coupon.

At this time, the mobile terminal 4 can acquire the information on the winning of the coupon through the reader/writer unit 22b in the digital signage apparatus 2, and can display the image of the coupon based on the information on the winning of the coupon, on the display unit 41, as illustrated in FIG. 11.

The digital signage apparatus 2 completes the process and is ready for a next user coming to the shop.

Figure 12:
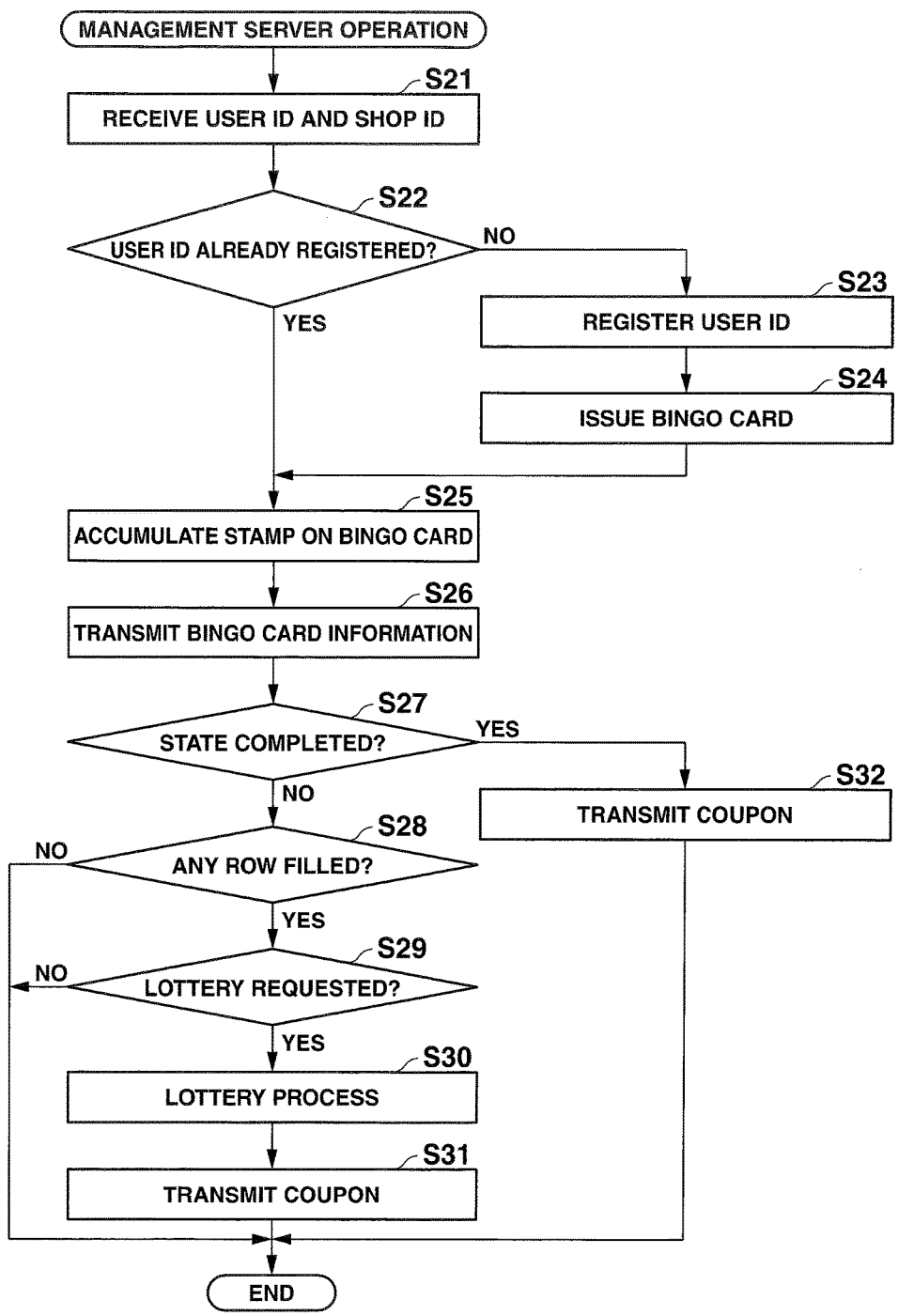
FIG. 12 is a flow chart illustrating an operational process in the management server.

An operational process of the management server 3 will now be explained in the case of applying the display system 1 according to the present invention to the lottery system with reference to the flow chart in FIG. 12. In this exemplary explanation, the stamp rally is held by scouring a plurality of chain shops provided with the digital signage apparatuses 2.

By transmission from the digital signage apparatus 2, the management server 3 receives the shop ID assigned to the digital signage apparatus 2 and the user ID of the mobile terminal 4 in correspondence with step S12 in the operational process of the digital signage apparatus (step S21).

The control unit 33 in the management server 3 determines whether the received user ID is already registered (step S22).

If the control unit 33 determines that the received user ID is registered (step S22; YES), the process goes to step S25.

If the control unit 33 determines that the received user ID is not registered (step S22; NO), the control unit 33 stores and registers the user ID in the storage unit 32 (step S23). The control unit 33 creates and issues a bingo card in the form of a stamp rally sheet including shops involving the stamp rally for each registered user ID (step S24), and the process goes to step S25. The bingo card is created by, for example, randomly placing the information on the shops at a plurality of designated sites. The issued bingo card information is stored in the storage unit 32.

In step S25, the control unit 33 in the management server 3 accumulates a stamp based on the received shop ID on the bingo card in association with the received user ID (step S25). The information on the bingo card including the accumulated stamps is stored in the storage unit 32.

After detecting a history of communication between the digital signage apparatus 2 and the mobile terminal 4 through the reader/writer unit 22b, or detecting the reception of data transmitted from the digital signage apparatus 2 by correlating the user ID of the mobile terminal 4 with the shop ID (inherent information) assigned to the digital signage apparatus 2, the control unit 33 in the management server 3 determines acquisition of the shop ID (inherent information) corresponding to each designated site in the mobile terminal 4 and accumulates stamps on the basis of the shop ID on the bingo card in association with the user ID.

The control unit 33 in the management server 3 then transmits the bingo card information which is associated with the user ID of the mobile terminal 4 and which includes the accumulated stamps based on the shop IDs of the digital signage apparatuses 2 in communication with the mobile terminal 4 through the reader/writer unit 22b in correspondence with step S13 in the operational process of the digital signage apparatus, to the digital signage apparatus 2 (step S26).

The control unit 33 then determines whether all the cells of the bingo card are filled with stamps (a complete state) (step S27).

If the control unit 33 in the management server 3 determines that a complete state is not achieved (step S27; NO), the control unit 33 determines whether any row on the bingo card is filled with stamps (step S28). If the control unit 33 in the management server 3 determines that no row is filled (no bingo is achieved) (step S28; NO), the management server 3 completes the process and is ready for next communication with the digital signage apparatus 2.

If the control unit 33 in the management server 3 determines that one row is filled (bingo is achieved) (step S28; YES) (for example, if the display unit 41 in the mobile terminal 4 displays the bingo card having one diagonal row in a bingo state as illustrated in FIG. 9), the control unit 33 in the management server 3 determines whether the lottery request instruction in accordance with the number of the filled rows is received from the digital signage apparatus 2, in correspondence with steps S16 and S17 in the operational process of the digital signage apparatus (step S29).

If the control unit 33 in the management server 3 determines that the lottery request instruction is not received (step S29; NO), the management server 3 completes the process and is ready for next communication with the digital signage apparatus 2.

If the control unit 33 in the management server 3 determines that the lottery request instruction is received (step S29; YES), the control unit 33 in the management server 3 performs a lottery process in response to the completion of bingo with the stamps based on the accumulated shop IDs on the bingo card in association with the user ID of the mobile terminal 4, and determines information on the winning of the lottery as privilege information for the mobile terminal 4 allocated to the user ID (step S30). In the lottery process, it is preferred to increase the odds of winning or to win a prize with a higher order in accordance with the number of filled rows.

The control unit 33 in the management server 3 transmits the information on the winning of the lottery (for example, coupon data) as a result of the lottery process in correspondence with step S18 in the operational process of the digital signage apparatus (step S31).

The management server 3 then completes the process and is ready for next communication with the digital signage apparatus 2.

If the control unit 33 in the management server 3 determines that all the cells of the bingo card are filled with stamps (a complete state) (step S27; YES), the management server 3 transmits the information on the winning of the coupon (for example, coupon data) in response to the complete state on the bingo card in association with the user ID of the mobile terminal 4 in correspondence with step S19 in the operational process of the digital signage apparatus, to the digital signage apparatus 2 (step S32).

The management server 3 then completes the process and is ready for next communication with the digital signage apparatus 2.

The above lottery system including the display system 1 according to the present invention enables the user having the mobile terminal 4 to enjoy the stamp rally involving scouring the shops at a plurality of designated sites and collecting stamps as a record on utilization of the digital signage apparatuses 2 of the several shops (for example, a history of communication between the digital signage apparatus 2 and the mobile terminal 4 through the reader/writer unit 22b). This system can provide privilege information, such as a discount coupon, through the lottery process in accordance with the collected stamps.

Additionally, the user enjoying the stamp rally to acquire privilege information views the digital signage apparatus 2 more frequently and thus watches commercial messages displayed on the digital signage apparatus 2 many times.

The lottery system including the display system 1 according to the present invention enables a user to enjoy the stamp rally involving scouring the digital signage apparatuses 2 placed at a plurality of designated sites (for example, chain shops). The user participating in the stamp rally watches commercial messages displayed on the digital signage apparatus 2 at a high frequency and visits chain shops advertising the commercial messages many times. This can further enhance effectiveness of advertising using the digital signage apparatus 2.

In particular, many users are impressed with advertised objects while enjoying the stamp rally. The advertising information readily accepted by the users exerts higher advertising effectiveness.

In the stated embodiment, the mobile terminal 4 communicates with the digital signage apparatus 2 through the reader/writer unit 22b to acquire the shop ID assigned to the digital signage apparatus 2. The present invention however can employ any other scheme. For example, the mobile terminal 4 may capture a QR code (Registered trademark) appearing on the display unit 27 in the digital signage apparatus 2 through the imaging unit 46 to communicate with the digital signage apparatus 2 (or the management server 3) and to acquire the shop ID assigned to the digital signage apparatus 2.

In the stated embodiment, the user determines playing the lottery after completion of bingo of the stamps collected on the bingo card; however the present invention may have any other scheme. For example, the lottery process may automatically be performed for each bingo state on one row.

The stated embodiment involves the stamp rally using a bingo card; however the stamp rally sheet may have any form other than the bingo card. For example, the lottery process may also be performed when a predetermined number of stamps are collected.

The present invention should not be limited to the stated embodiment.

In the stated embodiment, the shops at plurality of designated sites are randomly placed in the cells of the bingo card. Alternatively, the arrangement of the shops in the cells of the bingo card may be determined in accordance with conditions tailored for a predetermined purpose of the organizer of the stamp rally.

For example, a stamp rally will now be described which involves scouring a plurality of shops (a plurality of designated sites) in a shopping mall and collection of stamps based on the shop IDs assigned to the digital signage apparatuses 2 placed at the respective shops (respective designated sites).

Figure 13A:
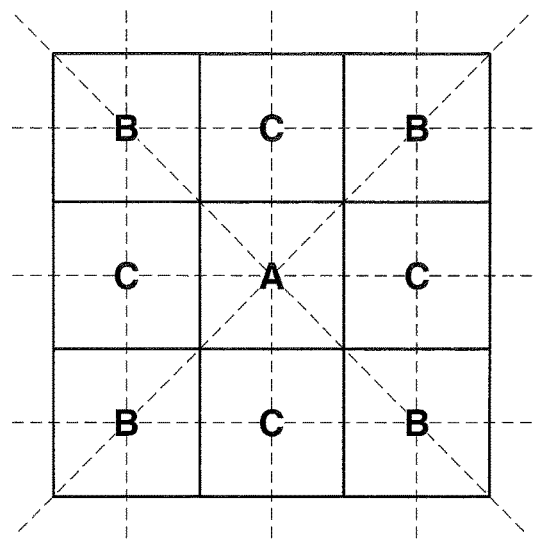
FIG. 13A illustrates cells contributing to the completion of a bingo state in a bingo card.

For example, in a bingo card including nine (three by three) cells in total as illustrated in FIG. 13A, a central cell "A", corner cells "B", and cells "C" between corners have different rates of contribution on the completion of a bingo state. For example, the central cell "A" contributes to the completion of four bingo states in vertical, horizontal, and diagonal (right upward and left upward) rows, the corner cells "B" contribute to the completion of three bingo states in vertical, horizontal, and diagonal rows, and the cells "C" between corners contribute to the completion of two bingo states in vertical and horizontal rows.

Accordingly, the organizer of the stamp rally may determine which of the shops are preferentially allocated to the cell "A" or the cell "C" of the bingo card in accordance with conditions in consideration of the advertising effectiveness of the stamp rally.

For example, the count of the communication between the digital signage apparatus 2 and the mobile terminals 4 of multiple users participating in the stamp rally up to the previous day may be stored (for example, stored in the storage unit 32 in the form of a communication count storage unit) for each designated site during the stamp rally period. Then, a shop having a history of fewer visits of the users may more preferentially be allocated to bingo cards and to cells having higher contribution to the completion of a bingo state.

Figure 13B:
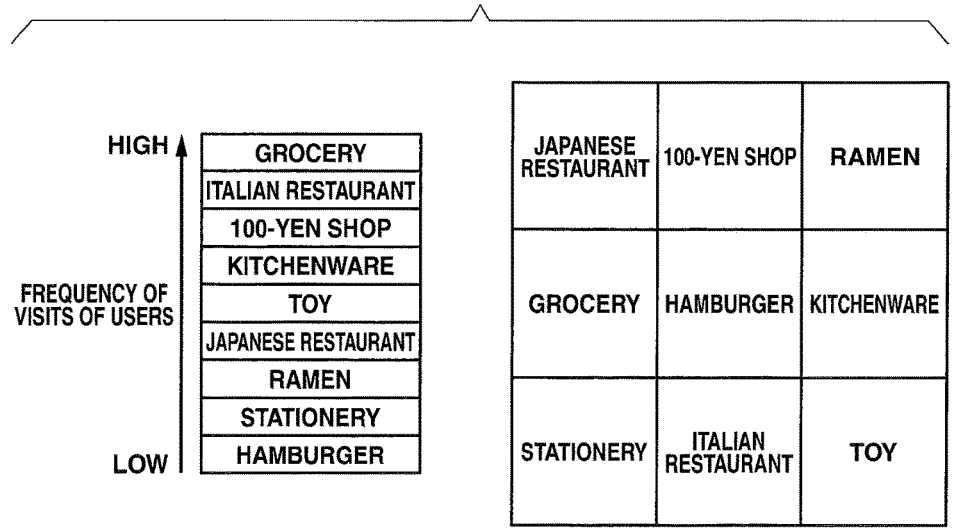
FIG. 13B illustrates an example arrangement of shops in a bingo card.

Specifically, as illustrated in FIG. 13B, the shops targeted for the stamp rally in a shopping mall are listed on the order of the frequency at which users visit: a grocery store, an Italian restaurant, a 100-yen store, a kitchenware store, a toy store, a Japanese restaurant, a ramen- or Chinese noodle shop, a stationery shop, and a hamburger shop. In this example, a bingo card is created so as to allocate the hamburger shop with the lowest rank to the central cell "A" and four shops with the highest ranks (the grocery store, the Italian restaurant, the 100-yen shop, and the kitchenware store) to the cells "C" between corners.

This urges users aiming at the completion of a bingo state to go to the hamburger shop. In other words, the users can be urged to go to, for example, newly-opened unfamiliar shops or quiet shops.

In contrast, if the grocery store with the highest rank is placed in the central cell "A", the bingo card can readily complete a bingo state. This can urge users aiming at the completion of a bingo state to go to many shops.

Additionally, the count of communication between the digital signage apparatus 2 and the mobile terminals 4 of multiple users participating in the stamp rally on the stamp rally day is stored (for example, stored in the storage unit 32 in the form of a communication count storage unit) for each designated site. A shop having a history of fewer visits of the users is then allocated to bingo cards and to cells having higher contribution to the completion of a bingo state more preferentially than a shop with more visitors on the stamp rally day. This can control a pattern of the users strolling about the plurality of shops to adjust the congestion in the shops.

In the stated embodiment, the count of communication between the digital signage apparatus 2 and the mobile terminals 4 of multiple users participating in the stamp rally on the stamp rally day or up to the previous day is stored for each designated site during the stamp rally period to record the overall trend of the stamp rally participants visiting the shops; however, the present invention may have any other scheme. For example, the count of communication between the digital signage apparatus 2 and the mobile terminal 4 of each user participating in a previous stamp rally may be stored for each designated site. (That is, designated sites visited by each user and the frequency of the visits may be stored in the storage unit 32 to record the trend of each user visiting the shops.) This scheme can create a bingo card in accordance with the preference of each user. For example, a shop which the user visits many times or a shop which the user less visits (or a shop which the user never visited before) is placed in the central cell "A" of the bingo card. This can control a pattern of the user strolling about the plurality of shops for the completion of a bingo state.

In this way, a pattern of the user strolling about the plurality of shops can be controlled to urge the user to watch the commercial messages displayed on the digital signage apparatuses 2 placed in the shops many times.

The organizer of the stamp rally can also determine the priority of the shops allocated to cells of the bingo card in accordance with, for example, a predetermined purpose or condition such that the users stroll about the plurality of shops (designated sites) in the shopping mall.

For example, the organizer of a stamp rally sets "high" priority to shops in a eating-out category (the Italian restaurant, the Japanese restaurant, the ramen shop, the hamburger shop) such that the users visit the eating-out shops more frequently. In this case, information on the shops (designated sites) set as "high" priority is stored (for example, stored in the storage unit 32 in the form of a priority storage unit). The four shops set as "high" priority may then be allocated to the bingo card and to the corner cells "B" of the bingo card to create, for example, a bingo card illustrated in FIG. 14.

If the shops in the same eating-out category (the Italian restaurant, the Japanese restaurant, the ramen shop, the hamburger shop) are placed in the corner cells "B" of the bingo card as described above, the user intending to visit the shops in the category strolls about the shopping mall for the completion of a bingo state for a long time each day or for several days.

This can urge the user to stroll about the plurality of shops and to watch the commercial messages displayed on the digital signage apparatuses 2 placed in the shops many times.

The organizer of the stamp rally can also establish a time designated for visiting a shop as the priority such that the users stroll about the plurality of shops (designated sites) in the shopping mall.

For example, the organizer of the stamp rally stores the information on the priority of a time zone for urging the users to visit each shop (time designated for visiting each shop) on the basis of data about a time zone involving fewer users in each shop (for example, stored in the storage unit 32 in the form of a priority storage unit). The shops may be allocated to the cells of the bingo card in accordance with the priority of the time designated for visiting a shop to create, for example, a bingo card illustrated in FIG. 15.

Since the stamps are provided in fixed time zones in this way, the user strolls about the shopping mall so as to visit the plurality of shops at a time in the time zones.

In this way, the user can be urged to stroll about the plurality of shops to watch the commercial messages displayed on the digital signage apparatuses 2 placed in the shops many times. This scheme can also urge the user to go to each shop in a time zone involving fewer users in the shop and can increase the sales of the shop using the stamp rally.

For designation of time of visiting the shop, for example, the time of the communication between the digital signage apparatus 2 and the mobile terminals 4 of multiple users participating in the stamp rally up to the previous day is stored (for example, stored in the storage unit 32 in the form of a communication time storage unit) for each designated site during the stamp rally period. A time zone involving a lower count of communication may be set as a time zone for visiting the shop at a designated site more preferentially than a time zone involving a higher count of communication to create a bingo card (for example, the bingo card illustrated in FIG. 15).

Since the stamps are provided in fixed time zones in this way, the user strolls about the shopping mall so as to visit the plurality of shops at a time in the time zones. The time of visiting shops can be designated to control a pattern of the user strolling about the plurality of shops. This can adjust the congestion in the shops.

This can urge the user to stroll about the plurality of shops and to watch the commercial messages displayed on the digital signage apparatuses 2 placed in the shops many times. This scheme can also urge the user to go to each shop in a time zone involving fewer users in the shop and can increase the sales of the shop using the stamp rally.

The control unit 33 in the management server 3 determines the congestion in each shop to allocate the priority to the shop in accordance with the congestion (priority data is stored in, for example, the storage unit 32 in the form of a priority storage unit) depending on, for example, the count of communication of the digital signage apparatus 2 placed in the shop, the register operational rate, or a recognition process on a visitor in the shop using a monitoring camera. A bingo card may be created so as to preferentially include a shop involving less congestion in the bingo card.

Alternatively, the priority of each shop may be determined in accordance with the amounts of support money for the stamp rally paid by the shops targeted for the stamp rally (priority data is stored in, for example, the storage unit 32 in the form of a priority storage unit). A bingo card may then be created so as to more preferentially include a shop paying more support money in the bingo card.

According to the present embodiment, the management server 3 in the display system 1 creates a stamp rally sheet for each user ID of the mobile terminal 4 of the user participating in the stamp rally. The user of the mobile terminal 4 can thereby acquire the stamp rally sheet to participate in the stamp rally involving scouring the digital signage apparatuses 2 placed at the plurality of designated sites. The user scouring the digital signage apparatuses 2 placed at the plurality of designated sites can also be urged to watch advertising information displayed on the digital signage apparatus 2 many times. This can further enhance advertising effectiveness of the digital signage apparatus 2.

The user participating in the stamp rally acquires inherent information (shop ID) assigned to the digital signage apparatus 2 through communication between the mobile terminal 4 and the digital signage apparatus 2. The management server 3 in the display system 1 then accumulates the inherent information on the stamp rally sheet. The management server 3 can perform a lottery process in accordance with the accumulation state of the inherent information (for example, the completion of a bingo state in the bingo card) in the stamp rally sheet to provide privilege information (for example, a discount coupon) to the mobile terminal 4 of the user. This can efficiently provide commercial messages on the digital signage apparatus 2 to the user participating in the stamp rally with game feeling for acquisition of the privilege information.

The management server 3 in the display system 1 can also create a stamp rally sheet in accordance with the count of communication between the mobile terminal 4 and the digital signage apparatus 2. This can create a stamp rally sheet preferentially including a designated site which is easy for the user to visit, thereby decreasing the difficulty of the stamp rally, or can create a stamp rally sheet preferentially including a designated site which is unattractive for the user to visit, thereby increasing the difficulty of the stamp rally, and can control attractive points of the stamp rally game.

The management server 3 in the display system 1 can also create a stamp rally sheet including more designated sites involving a lower count of communication between the mobile terminal 4 and the digital signage apparatus 2 than designated sites involving a higher count of the communication. This can urge the user to go to quiet or unfamiliar designated sites.

The management server 3 in the display system 1 can also create a stamp rally sheet in accordance with the record of time (time zone) of communication between the mobile terminal 4 and the digital signage apparatus 2. This can create a stamp rally sheet preferentially including a time zone at which the user is easy to visit a designated site, thereby decreasing the difficulty of the stamp rally, or can create a stamp rally sheet preferentially including a time zone at which the user is difficult to visit a designated site, thereby increasing the difficulty of the stamp rally, and can control attractive points of the stamp rally game.

The management server 3 in the display system 1 can also create a stamp rally sheet in which a time zone involving a lower count of communication between the mobile terminal 4 and the digital signage apparatus 2 rather than a time zone involving a higher count of communication is set as a time zone for visiting the shop at a designated site. This can urge the user to go to the designated site in a time zone involving fewer users in the shop to adjust the congestion in the shop.

The management server 3 in the display system 1 can also create a stamp rally sheet including a designated site in accordance with the priority provided for a predetermined purpose. This can create a stamp rally sheet preferentially including a designated site requiring a visit of the user and can urge the user to the designated site.

The stamp rally sheet created by the management server 3 in the display system 1 is used for a bingo game and therefore enables a stamp rally involving a bingo game.

In the stated embodiment, the cooperation of the digital signage apparatus 2 with the management server 3 creates a stamp rally sheet to enable the stamp rally. This embodiment however can employ any other configuration. For example, the digital signage apparatus 2 may have the function of the management server 3 to independently create a stamp rally sheet and enable the stamp rally.

In this case, the reader/writer unit 22*b* functions as an acquisition unit acquiring user information (user ID) from the mobile terminal 4.

The storage unit 25 functions as a user registering unit registering the user information (user ID) of the mobile terminal 4.

The control unit 23 functions as a sheet creating unit creating a stamp rally sheet including at least one of the plurality of designated sites for the user information (user ID) registered in the user registering unit (storage unit 25).

The reader/writer unit 22*b* functions as a transmitting unit transmitting the created stamp rally sheet data to the mobile terminal 4.

The storage unit 25 in the digital signage apparatus 2 stores a program for causing the components in the digital signage apparatus 2 to acquire the user information (user ID) from the mobile terminal 4, register the user information (user ID), create a stamp rally sheet for the user information (user ID), and transmit the data of the stamp rally sheet to the mobile terminal 4. The control unit 23 in the digital signage apparatus 2 controls the operation of each component in the apparatus on the basis of the program stored in the storage unit 25.

The present invention is also applicable to any other embodiment, in addition to the embodiments described above. Proper modifications can be applied without departing from the scope and spirit of the present invention.

The scope of the present invention is not limited to the embodiments described herein, is claimed in the accompanying claims, and includes the scope of equivalents thereof.

The entire disclosure of Japanese Patent Application No. 2013-066876 filed on Mar. 27, 2013 including specification, claims, drawings and abstract are incorporated herein by reference in its entirety.

What is claimed is:
1. A display system comprising:
digital signage apparatuses, wherein each of the digital signage apparatuses is placed at a corresponding one of a plurality of designated shops, and wherein each of the plurality of designated shops has a corresponding shop information; and
a management server,
wherein the each of the digital signage apparatuses includes:
a display configured to display advertisements;
a near-field communication (NFC) unit;
a digital signage apparatus-side communication unit; and
a controller configured to:
control the NFC unit to acquire user information from a terminal apparatus; and
control the digital signage apparatus-side communication unit to transmit the shop information of the corresponding shop at which the each of the digital signage apparatuses is placed together with the user information acquired by the NFC unit to the management server, and
wherein the management server includes:
a management server-side communication unit; and
a computer configured to:
control the management server-side communication unit to receive the shop information and the user information acquired by the NFC unit transmitted together from the each of the digital signage apparatuses;
register the user information acquired by the NFC unit;
control a storage to store;
a first updated count of communication between a first plurality of the terminal apparatus and the digital signage apparatus for each of the designated shops, wherein the first updated count of communication for a first shop of the plurality of designated shops is lower than the first updated count of communication for a second shop of the plurality of designated shops; and a second updated count of communication between a second plurality of the terminal apparatus and the digital signage apparatus for each of the designated shops, wherein the second updated count of communication for the second shop is lower than the second updated count of communication for the first shop; and create a stamp rally sheet specific to the user information having a plurality of designated sites, wherein each of the plurality of designated sites is assigned to a corresponding one of the shop information in accordance with one of the first updated count and the second updated count, wherein in a case where the stamp rally sheet is created in accordance with the first updated count: assign more of the plurality of designated sites of the stamp rally sheet to the shop information of the first shop than the shop information of the second shop, assign a designated site of the plurality of designated sites having a higher contribution to the completion of the stamp rally sheet to the shop information of the first shop instead of the shop information of the second shop; or both, and wherein in a case where the stamp rally sheet is created in accordance with the second updated count: assign more of the plurality of designated sites of the stamp rally sheet to the shop information of the second shop than the shop information of the first shop, assign a designated site of the plurality of designated sites having a higher contribution to the completion of the stamp rally sheet to the shop information of the second shop instead of the shop information of the first shop; or both.

2. The display system according to claim 1,
wherein the computer of the management server is further configured to:
control the storage to store time of communication between the terminal apparatus and the digital signage apparatus for each of the designated shops; and
create the stamp rally sheet in which a time interval for visiting each of the designated shops is set in accordance with the time of the communication in each of the designated shops stored in the storage.

3. The display system according to claim 2,
wherein the computer of the management server is further configured to create the stamp rally sheet in which a time interval involving a lower count of the communication rather than a time interval involving a higher count of the communication stored in the storage is set as a time interval for visiting the designated shop.

4. The display system according to claim 1,
wherein the computer of the management server is further configured to:
control the storage to store priority of the plurality of designated sites for certain conditions; and
create the stamp rally sheet including the plurality of designated sites in accordance with the priority stored in the storage.

5. The display system according to claim 1,
wherein the stamp rally sheet is a sheet for a bingo game.

6. The display system according to claim 1,
wherein the computer of the management server is configured to:
accumulate identification information in each of the plurality of designated sites in the stamp rally sheet allocated to the terminal apparatus based on the shop information transmitted together with the user information acquired by the NFC unit;
determine whether a predetermined completion state of the stamp rally sheet has been reached based on the identification information accumulated; and
in response to determining that the predetermined completion state has been reached:
perform a lottery process;
determine privilege information based on a result of the lottery process; and
control the management server-side communication unit to transmit:
the stamp rally sheet including the identification information accumulated; and
the privilege information,
for display by the terminal apparatus.

* * * * *